United States Patent [19]
McCoy et al.

[11] 3,737,789
[45] June 5, 1973

[54] COUNT RATE DISCRIMINATOR

[75] Inventors: Donald D. McCoy, Pacheco; Bruce H. Shue, Livermore; Ralph G. Gutmacher, Danville, all of Calif.

[73] Assignee: The United States of America as represented by the United States Atomic Energy Commission, Washington, D.C.

[22] Filed: Dec. 21, 1971

[21] Appl. No.: 210,343

[52] U.S. Cl. .................................. 328/138, 328/140
[51] Int. Cl. ............................................ H03k 9/06
[58] Field of Search ................ 328/138, 140, 161; 307/233, 234

[56] References Cited

UNITED STATES PATENTS

| 3,305,732 | 2/1967 | Grossman et al. | 328/138 X |
| 3,383,605 | 5/1968 | Davidoff | 328/138 |
| 3,413,490 | 11/1968 | Breunig et al. | 307/233 |
| 3,526,717 | 9/1970 | Himes et al. | 328/140 X |
| 3,543,172 | 11/1970 | Seppeler | 328/140 X |
| 3,601,706 | 8/1971 | Battle et al. | 307/234 X |

*Primary Examiner*—John S. Heyman
*Attorney*—Roland A. Anderson

[57] ABSTRACT

A count rate discriminator which detects pulsed input signals having a pulse repetition rate within a selectable lower and higher pulse rate limit and which passes, during a predetermined time period, only those input pulses contributing to exceed the preselected low limit pulse rate providing said input pulse rate does not exceed the preselected high limit.

1 Claim, 3 Drawing Figures

COUNT RATE DISCRIMINATOR

BACKGROUND OF THE INVENTION

The invention described herein was made in the course of, or under, Contract No. W-7405-Eng-48 with the United States Atomic Energy Commission.

In the conventional microprobe system, a test sample of a material has various portions of the surface swept with an electron beam. The electron beam, upon striking the material surface, causes the product and emission of x-rays which are characteristic and representative of the various elements of the areas scanned. The x-rays are detected and selectively amplitude-discriminated by analog means, such as by a single channel analyzer. The discriminated signal is then applied to the Z axis of a cathode ray tube (CRT) display device (intensity control input) in order that the image intensity be related to the number of x-rays emitted and detected, and their relative amplitude. The electron beam is deflected in an $x$ and $y$ axis orientation by deflection coils, the $x$ and $y$ deflection voltage across the coils also electrically connected to the $x$ and $y$ deflection plates of the CRT display device so that there is spatial relationship between the test material sample and the display device screen. The characteristic disadvantage of the present conventional system above described is the image display of any one particular area exhibits poor contrast due to the low signal-to-noise ratio where the noise includes pulses due to background and to other proximate areas of the sample.

In accordance with the present invention, a pulse rate discriminator is incorporated between the x-ray detector and the z-axis input of the CRT display device. The subject pulse rate discriminator rejects those detected x-rays which lie outside an area of specific composition as not being within the prescribed pulse rate limits. By this means, the area of interest is selectively displayed without interference from pulses due to the continuous background or to areas of other composition. Thus the signal-to-noise ratio is raised and the contrast of the generated images enhanced.

SUMMARY OF THE INVENTION

The present invention comprises a pulse rate discriminator wherein an input string of electrical pulses is discriminated with respect to pulse repetition rate, i.e., the input pulse rate must lie between a preselected low pulse rate limit and a preselected upper pulse rate limit. The pulses so discriminated are transmitted to the z-axis of a CRT display device where they intensity modulate the display image. The pulse rate discriminator comprises three major components: a timer circuit which generates the basic clock pulse which repetitive rate cycles the total pulse rate discriminator; a scaler circuit which accepts the input pulses, counts and compares them per unit clock time with the preselected low pulse rate limit; and a gating circuit wherein the logical decision as to whether or not the input pulse rate is acceptable is made. If it is within the prescribed limits, the input pulses are passed to the CRT display device.

Accordingly, it is an object of the present invention to provide a means to discriminate an incoming string of pulses with respect to low and high pulse rate limits.

Further, it is an object of the present invention to provide a means to discriminate an incoming pulse rate with respect to easily selectable low and high pulse rate limits.

It is also an object of the present invention to provide an improved means of intensity modulating the display output of an electron microprobe system.

DESCRIPTION OF THE PREFERRED EMBODIMENT

Figure 1:
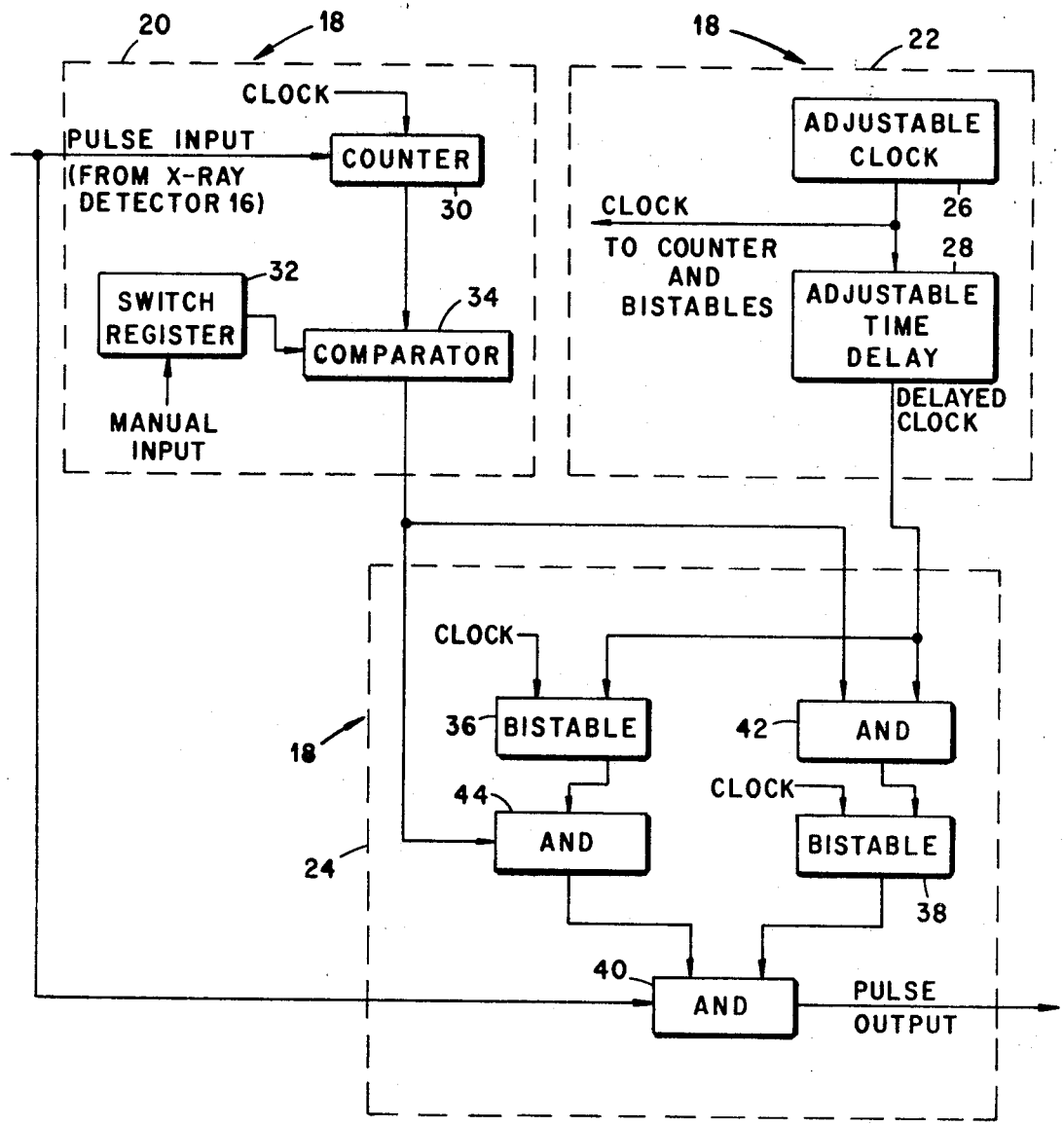
FIG. 1 is a schematic block diagram of the preferred embodiment of the present invention.

As shown in FIG. 1, the embodiment of the pulse rate discriminator which detects electrical input pulses whose pulse repetition rate lies between selectable lower and upper pulse rate limits and which passes those pulses which contribute to exceed the lower pulse rate limit during a predetermined time period providing the pulse rate does not exceed the upper limit is shown generally at 18. Pulse rate discriminator 18 is comprised of three major components: the timing circuit 22, the scaler circuit 20 and gating circuit 24.

Timing circuit 22 comprises an adjustable pulse rate clock 26 and an adjusable time delay 28 electrically connected to clock 26 output. Clock 26 pulse rate is set to any convenient value which permits counting of a sufficient number of discriminated pulses to give an adequate presentation. The adjustable time delay 28 is set to equal the ratio of the lower pulse rate limit to the upper pulse rate limit times the clock pulse repetition period. For example, if the pulse rate discriminator is to accept input pulses in the range 1,000 pps to 2,000pps, the clock rate may be set as desired, but the time delay must be 500 milliseconds for a clock pulse repetition of 1 second. The clock pulse is then distributed to the scaler circuit 20, and the clock pulse and delayed clock pulse distributed to the gating circuit 24, both circuits described below. The clock pulse commences the operation of the pulse rate discriminator 18 and recycles its operation.

Scaler circuit 20 comprises pulse counter 30 which receives the input electrical pulse from the source of pulses whose pulses are to be discriminated, said pulse counter 30 also having an input from clock 26, the clock pulse cycling the pulse counter 30 count of input electrical pulses back to zero on the receipt of every clock pulse. Counter 30 then directs the input electrical pulses to comparator 34, which comparator also receiving a bias number of pulses from switch register 32. The bias number of pulses which the switch register 32 disburses is set into the switch register manually and corresponds to the number of pulses per unit clock time which the lower pulse rate selected to be discriminated would have per unit clock time. Comparator 34 issues a voltage or pulse level when the incoming pulse counter 30 pulses exceed the number of bias pulses. The comparator output pulse, once established, remains until the next clock pulse at which point a new counting and comparing cycle is initiated. Thus, scaler circuit 20 receives the input electrical pulses and outputs a pulse level when the incoming input electrical pulses exceeds, per unit clock time, the preselected lower pulse rate pulses manually set in.

Figure 2:
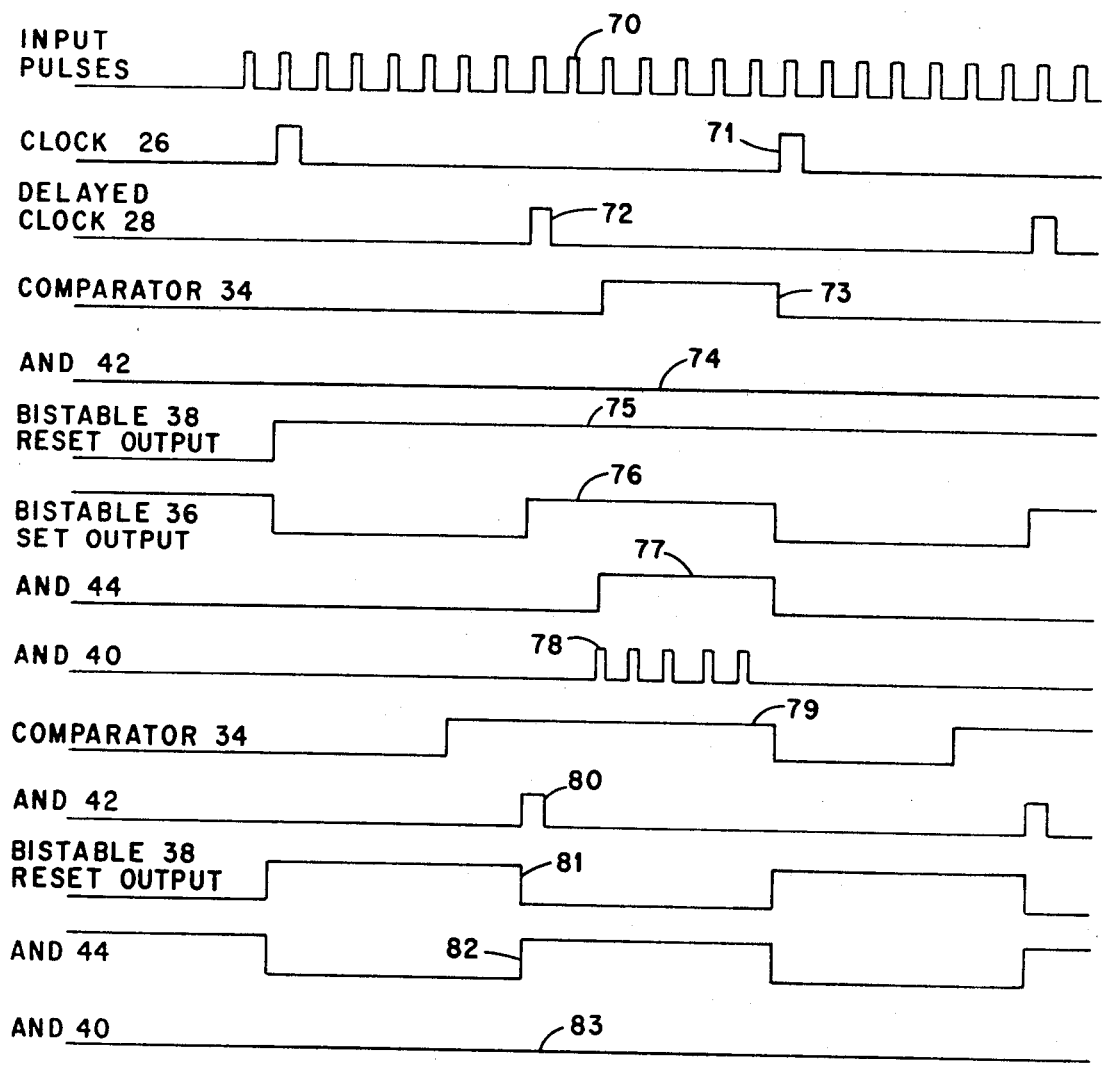
FIG. 2 illustrates the time relationship of various component electrical levels and pulses that are part of the logical flow.

Gating circuit 24 implements the decision of the pulse rate discriminator 18 as to whether the electrical input pulse repetition rate lies within the prescribed levels and, if so, indicates the actual number of pulses, per unit of clock time, that these pulses exceed the lower limit pulse rate pulses. Gating circuit 24 comprises two bistable logic elements, 36 and 38, and three logic AND gates, 40, 42 and 44. In operation and as shown in FIG. 1, AND 42 and bistable 38 inhibit AND 40 if the incoming electrical input pulse exceeds the preselected upper pulse rate limit, and bistable 36 and AND 44 inhibit AND 40 if the incoming electrical input pulse rate is less than the preselected lower pulse rate limit. Specific operational details are as follows. AND 42 gate receives delayed clock pulse 72 (FIG. 2) and comparator output 73. AND 42 outputs a pulse (or voltage level) only when there is coincidence of pulses or voltage levels on its input. Therefore, for the case illustrated by pulses 72 and 73, the output is zero as shown by waveshape 74. Clock pulse 71 has previously set bistable 38 reset output to a voltage level shown by waveshape 75. Bistable 38 thus places a voltage level on one of AND 40 inputs and as such, does not itself inhibit AND 40. Delayed clock pulse 72 feeds bistable 36 set input and clock pulse 71 the reset input. Bistable 36 set output, illustrated by waveform 76, is directed, together with comparator output 73 into AND 44 gate. AND 44 output is shown in FIG. 2 by waveshape 77. AND 44 gate output and bistable 38 reset output are gated into AND 40 gate. AND 40 gate also has an input of the initial electrical input pulse rate pulses and thus provides a pulse output when the pulse rate discriminator 18 senses that the incoming electrical pulse rate lies between the preselected upper and lower limit. Waveshape 78 illustrates the output of AND 40 which is the sought output.

For the case that the incoming input electrical pulse rate exceeds the preselected upper pulse rate limit, the initial effect is that comparator 34 overcomes the switch register 32 bias count and issues a voltage level or pulse output before the delayed clock output as illustrated by waveform 79 (FIG. 2). AND 42 gate output appears at waveshape 80 and bistable 38, which depends upon AND 42 output and the clock pulse is illustrated at waveform 81. The output of bistable 36 always remains the same for any case of input electrical pulse rate since it depends only upon clock pulse and delayed clock pulse and is shown by waveform 76. The output of AND 44 gate, depending upon bistable 36 output and comparator 34 output is illustrated at 82. The overall output of the pulse rate discriminator, i.e., the output of AND 40 gate, which depends upon bistable 38 and AND 44 outputs to pass the input electrical pulses, is drawn at 83 and shows no pulse output indicating the incoming electrical pulse rate lies somewhere out of the preselected limits.

In the case of the incoming input electrical pulse rate falling below the preselected lower pulse rate limit, the initial consequence is that the pulse counter 30 pulses never exceed the switch register 32 bias pulse count in comparator 34 during a clock period time and the comparator will not issue an output. Thus, the output from AND 44 gate and AND 42 gate will not be a pulse or voltage level, but be a "zero" output. The clock pulse sets bistable 38 down so that its reset output remains at a level and places the level on the input to AND 40 gate, the pulse rate discriminator output. However, the other input to AND 40 gate, i.e., the output of AND 44 gate, is always "zero"; therefore the output of the discriminator is zero — and indicating the input electrical pulse rate does not lie between the preselected upper and lower pulse rate limits.

Figure 3:
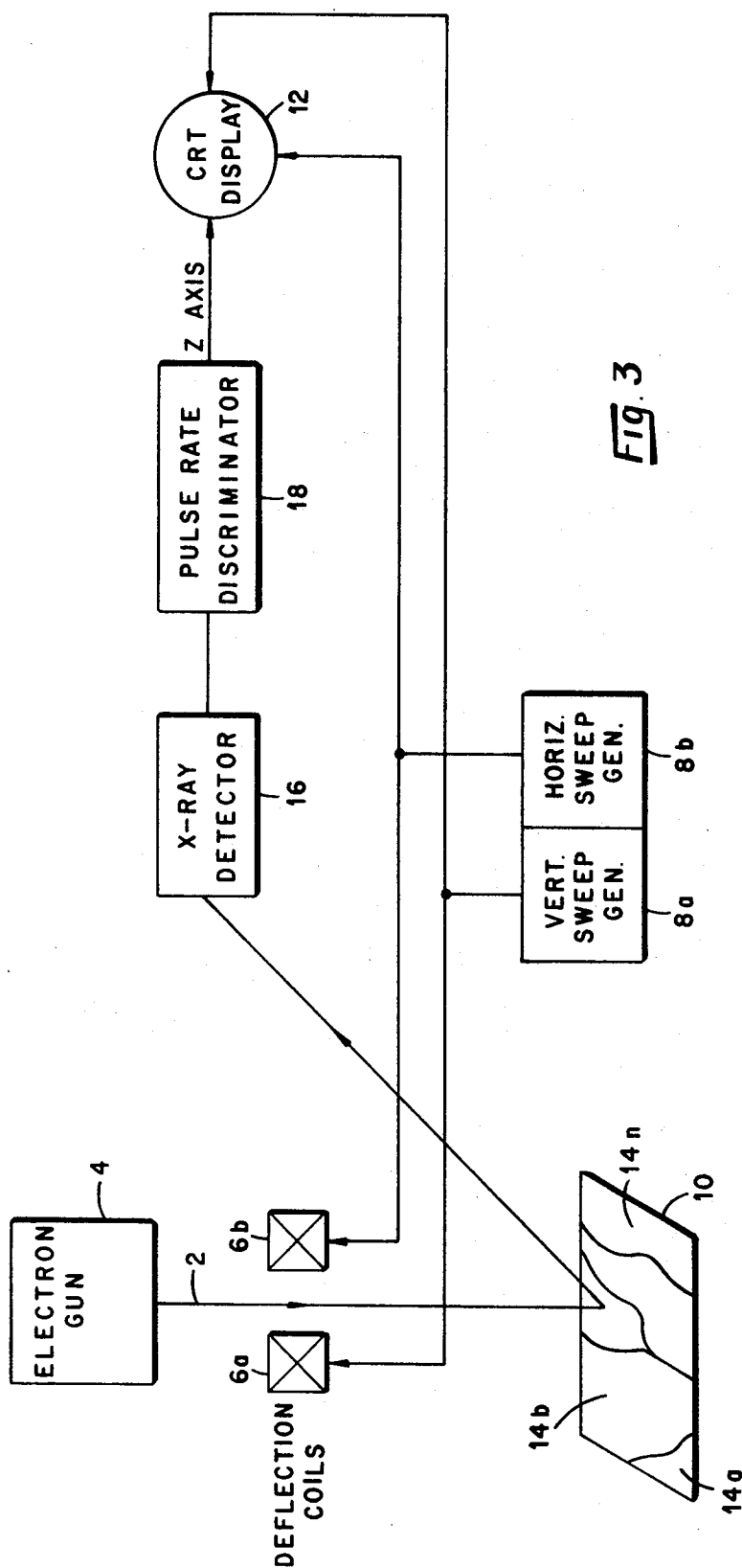
FIG. 3 is a schematic block diagram of the present invention incorporated into an electron microprobe system.

FIG. 3 illustrates the embodiment of the invention in an application wherein the inventive pulse rate discriminator output is used to intensity modulate an oscilloscope cathode ray tube display and thus create the illusion of a three dimensional presentation. In particular, FIG. 3 shows a conventional microprobe system wherein the direction of an electron beam 2 produced by an electron gun 4 is controlled, via vertical deflection coil 6a and horizontal deflection coil 6b, by vertical sweep generator 8a and horizontal sweep generator 8b to permit left-to-right and top-to-bottom scanning of a sample 10 under test. Sweep generators 8a and 8b are also connected to the vertical and horizontal deflection plates respectively of the CRT display device 12 which permits generation of a sweep pattern in synchrony with and similar to the test sample 10 scanning pattern. The sample 10 under test contains, typically, a number of different areas or phases 14a, 14b, . . . 14n, the dimensions and relative patterns to be selectively displayed on the CRT screen 12. Upon impact of the electron beam 2 with the sample 10, x-rays are produced which have an energy characteristic of the elements present in the particular area or phase 14 receiving the electron beam. An x-ray detector 16 converts the energy of the resultant x-rays into a pulsed signal having representative amplitude and pulse rate. Pulse rate discriminator 18 receives the pulsed signals from the x-ray detector 16 and after having selectively chosen those pulses as hereinabove described, transmits those pulsed signals to the z-axis of the CRT display device 12.

In operation, and when the input pulsed signals pulse rate lies between the preselected upper and lower pulse rate limits, the pulse rate discriminator intensity modulates the CRT display device (z-axis) and thereby generates a visible image of the associated phase, the image placement on the display being in spatial relationship to the phase location on the test sample.

The components utilized in the subject invention are within the skill of the art and are commercially available, for example, Control Logic circuit logic boards have been used through-out.

Although the foregoing embodiment has been described in detail, there are obviously many other embodiments and variations in configuration which can be made by a person skilled in the art without departing from the spirit, scope, or principle of the invention, for example, the adjustable clock may be reset for a new reference clock pulse for the case when the cating circuit is inhibited by virtue of the input pulse repetition rate exceeding the selected upper pulse rate limit and thus initiate a whole new sample cycle without waiting for the previous clock period to expire. Therefore, this invention is not to be limited except in accordance with the scope of the appended claims.

We claim:

1. In an electrical pulse rate discriminator comprising a timing circuit including clock pulse generation means; a scaler circuit including input pulse counting means and comparing means; and a gating circuit receiving said timing circuit clock pulse generation means output and said scaler circuit comparing means output, said gating circuit including pulse logic means whereby said timing circuit output and scaler circuit comparing means output are logically combined to pass portions of an associated pulse input whose pulse rate lies intermediate a lower and upper pulse rate limit;

said timing circuit clock generation means including an adjustable pulse rate clock pulse generator and an adjustable time delay electrically connected thereto, said time delay adjusted to equal the ratio of the lower pulse rate limit to the upper pulse rate limit times the clock pulse repetition period;

said scaler circuit pulse counting means including a resettable pulse counter, said pulse counter reset by said clock generation means; said comparing means including switch register means and comparator means, said pulse counter and said switch register means electrically connected to said comparator means whereby said comparator means outputs a pulse when said pulse counter output pulses exceed an associated pulse count stored in said switch register means;

said switch register means including means for manually inserting an associated pulse count into said switch register means whereby said associated pulse count is equal to the lower pulse rate limit number of pulses per unit clock time;

said gating circuit logic means comprising a first bistable logic element with set input electrically connected to said timing circuit clock pulse time delay output and reset input electrically connected to said clock pulse, a first AND logic element with one input connected to the first bistable set output and a second input connected to said comparator means output whereby said first AND logic element has a pulse output when said associated input pulse rate exceeds said lower pulse rate limit; a second AND logic element with one input electrically connected to said clock pulse time delay output and a second input electrically connected to said comparator means output, a second bistable logic element with set input electrically connected to said second AND output and the reset input electrically connected to said clock pulse whereby said second bistable has a pulse output when said associated input pulse rate is less than the upper pulse rate limit; and a third AND logic element with one input electrically connected to said first AND output, a second input electrically connected to said second bistable reset output, and a third input electrically connected to said associated input pulse whereby said input pulse is gated through said third AND when said associated input pulse rate lies intermediate said lower and upper pulse rate limits.

* * * * *